United States Patent
Thoukydides

(10) Patent No.: US 8,203,991 B2
(45) Date of Patent: Jun. 19, 2012

(54) COMMUNICATION IN DUAL PROTOCOL ENVIRONMENTS

(75) Inventor: Alexander Thoukydides, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 646 days.

(21) Appl. No.: 12/065,477

(22) PCT Filed: Sep. 4, 2006

(86) PCT No.: PCT/GB2006/003267
§ 371 (c)(1),
(2), (4) Date: May 15, 2008

(87) PCT Pub. No.: WO2007/036687
PCT Pub. Date: Apr. 5, 2007

(65) Prior Publication Data
US 2008/0259837 A1    Oct. 23, 2008

(30) Foreign Application Priority Data

Sep. 30, 2005    (GB) .................................. 0519945.0

(51) Int. Cl.
H04J 3/08    (2006.01)
H04B 7/14    (2006.01)
H04L 12/54    (2006.01)

(52) U.S. Cl. ......... 370/315; 370/293; 370/401; 370/501
(58) Field of Classification Search .................. 370/274, 370/279, 293, 315, 492, 501; 455/7, 11.1
See application file for complete search history.

(56) References Cited

U.S. PATENT DOCUMENTS

| 4,873,386 | A * | 10/1989 | Hagen et al. ................... 585/471 |
| 7,050,452 | B2 * | 5/2006 | Sugar et al. .................... 370/465 |
| 7,079,812 | B2 * | 7/2006 | Miller et al. .................. 455/63.1 |
| 7,177,294 | B2 * | 2/2007 | Chen et al. ..................... 370/338 |
| 7,193,965 | B1 * | 3/2007 | Nevo et al. ..................... 370/230 |
| 7,742,739 | B2 * | 6/2010 | Diaz Cervera et al. ...... 455/11.1 |
| 2003/0147368 | A1 | 8/2003 | Eitan et al. |
| 2005/0025174 | A1 | 2/2005 | Fischer et al. |
| 2005/0176367 | A1 * | 8/2005 | Verloop et al. ............... 455/11.1 |
| 2006/0211372 | A1 * | 9/2006 | Shellhammer et al. ....... 455/41.2 |
| 2008/0123580 | A1 * | 5/2008 | Vathulya ....................... 370/314 |

OTHER PUBLICATIONS

Chiasserini et al., "Coexistence Mechanisms for Interference Mitigation Between IEEE 802.11 WLANS and Bluetooth," Proceedings IEEE Infocom 2002, The Conference on Computer Communications, New York, vol. 1, Conf. 21, Jun. 23, 2002, pp. 592-593.
Godrey, "802.11 and Bluetooth Coexistence Techniques," Technical Report CMU-CS-98-105, XP002250571, Nov. 4, 2002, pp. 8-10.

* cited by examiner

*Primary Examiner* — Warner Wong
(74) *Attorney, Agent, or Firm* — Novak Druce DeLuca + Quigg LLP

(57) ABSTRACT

A communication device (1) comprising: a first communication system (4) for transmitting and/or receiving signals according to a first protocol; a second communication system (3) for transmitting and receiving signals according to a second protocol, the second protocol having the facility that a receiver (3) can indicate to a transmitter (2) that it is in an unresponsive state whereby the transmitter can be inhibited from transmitting data to the receiver when it is in the unresponsive state; a signal activity detector (9) for detecting activity in the signals of the first protocol; and a control unit (7) responsive to the signal activity detector for causing the second communication system to indicate that it is in an unresponsive state.

29 Claims, 2 Drawing Sheets

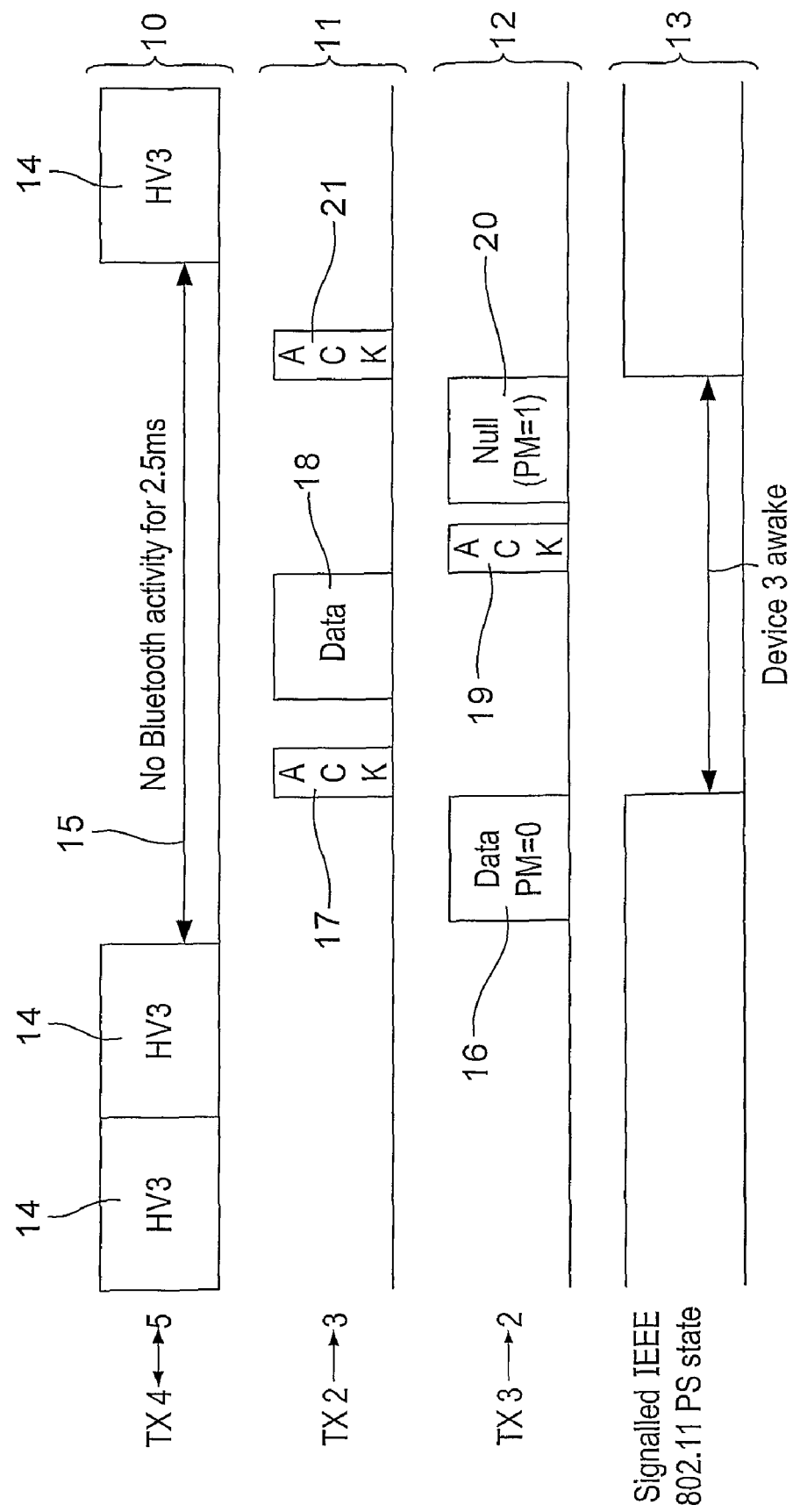

COMMUNICATION IN DUAL PROTOCOL ENVIRONMENTS

This invention relates to communication in environments where interference from signals relating to one communication protocol can hinder the reception of signals relating to another communication protocol.

One example of such an environment is when transceivers for two protocols that occupy the 2.4 GHz ISM (industrial, scientific, and medical) band are located close to each other or even in the same device: for instance a handheld communication device. As an example, a transceiver for IEEE 802.11b/g wireless LAN (local area network) signals could be located near to or in the same device as a transceiver for Bluetooth signals. IEEE 802.11b/g and Bluetooth share the 2.4 GHz band, resulting in mutual interference between the two protocols. Because of this mutual interference it is desirable to adopt a coexistence scheme that enhances the ability of a receiver for one of those protocols to operate in the presence of interference from signals of the other protocol.

Existing coexistence schemes, such as Bluetooth AFH (adaptive frequency hopping) and IEEE 802.15.2 PTA (packet traffic arbitration) are inadequate to support high duty-cycle operation of both IEEE 802.11 and Bluetooth when transceivers for each protocol are located close to each other. This is because it is not possible for an IEEE 802.11b/g receiver to successfully receive packets at the same time that a closely co-located Bluetooth transmitter is transmitting (even if AFH is used to avoid operation on the same frequency). Since there is also no control over when a peer IEEE 802.11 device will attempt to transmit data, IEEE 802.11 data will be lost if it happens to arrive when the Bluetooth transmitter is transmitting. The resulting packet failures trigger IEEE 802.11's exponential back-off behaviour resulting in exceedingly poor throughput and high latency.

This behaviour is particularly problematic for applications that are sensitive to latency problems, such as VoIP (voice over internet protocol). One example of a particularly problematic situation is when a mobile voice handset, acting as a relay device, is receiving voice data via VoIP from an IEEE 802.11 access point (AP) and relaying the voice data to a headset by a synchronous Bluetooth link. This situation is illustrated in FIG. 1. The transmission and reception of voice packets by both the IEEE 802.11 and Bluetooth transceivers of the handset is essentially periodic (with some jitter). However, there is no synchronisation and the periodicity is different for the two radio links, so collisions between packets are inevitable. Without any effective protection mechanism almost every IEEE 802.11 packet from the AP to the handset could be corrupted. Since the traffic is voice traffic, and therefore cannot tolerate significant delays, the collisions can result in very poor audio transfer.

There is therefore a need for a mechanism to improve coexistence between systems such as IEEE 802.11 and Bluetooth.

According to one aspect of the present invention there is provided a communication device comprising: a first communication system for transmitting and/or receiving signals according to a first protocol; a second communication system for transmitting and receiving signals according to a second protocol, the second protocol having the facility that a receiver can indicate to a transmitter that it is in an unresponsive state whereby the transmitter can be inhibited from transmitting data to the receiver when it is in the unresponsive state; a signal activity detector for detecting activity in the signals of the first protocol; and a control unit responsive to the signal timing detector for causing the second communication system to indicate that it is in an unresponsive state.

According to a second aspect of the present invention there is provided a method for operating a communication device comprising a first communication system for receiving and/or transmitting signals according to a first protocol and a second communication system for transmitting and receiving signals according to a second protocol, the second protocol having the facility that a receiver can indicate to a transmitter that it is in an unresponsive state whereby the transmitter can be inhibited from transmitting data to the receiver when it is in the unresponsive state; the method comprising: detecting or predicting periods of activity in the signals of the first protocol; and causing the second communication system to indicate that it is in an unresponsive state when the first protocol is detected or predicted to be active.

Preferably the control unit is responsive to the signal activity detector for causing the second communication system to indicate that it is in an unresponsive state when the first protocol is detected to be active.

Preferably the control unit is responsive to the signal timing detector for causing the second communication system to indicate that it is in a responsive state when the first protocol is detected to be inactive.

Preferably the communication device comprises a signal activity predictor responsive to the signal activity detector for predicting activity in the signals of the first protocol; and wherein the control unit is responsive to the signal timing detector via the signal activity predictor for causing the second communication system to indicate that it is in an unresponsive state when the first protocol is predicted to be active.

Preferably the signal activity predictor is arranged to predict activity in the signals of the first protocol by detecting periodicity in the signals of the first protocol. Alternatively the signal activity predictor may be arranged to predict activity in the signals of the first protocol by detecting synchronisation of the signals of the first protocol with a pre-stored activity schedule.

The control unit may be responsive to the signal timing predictor for causing the second communication system to indicate that it is in a responsive state when the first protocol is predicted to be inactive.

The first and second protocols may be different or the same. Advantageously he first and second protocols occupy a common frequency band. The first protocol may be Bluetooth. The second protocol may be a wireless local area network protocol, such as an IEEE 802.11 protocol.

The said state may be a power-saving state.

One of the first and second protocols may be the Bluetooth SCO or eSCO protocol.

Preferably the first communication system and the second communication system are located within a common housing.

The second communication system may be arranged to relay traffic data received by the first communication system according to the first protocol by transmitting it according to the second protocol.

The first communication system and the second communication system may have antennas that are located such that signals of the first protocol transmitted by the antenna of the first communication system are capable of interfering with signals of the second protocol so as to prevent signals of the second protocol from being successfully received by the first communication system.

The first communication system and the second communication system may have a common antenna, and the systems may be arranged such that signals of the first protocol transmitted using the antenna by the first communication system are capable of interfering with signals of the second protocol so as to prevent signals of the second protocol from being successfully received through the antenna by the first communication system.

The said signals of the first protocol may be signals transmitted according to the first protocol by a further device remote from the said radio transmitter.

The method may comprise ceasing transmitting traffic data to the communication device by means of the second protocol when the second communication system is indicated to be in the unresponsive state.

The method may comprise comprising buffering traffic data intended for the communication device when the second communication system is indicated to be in the unresponsive state.

The method may comprise the step of causing the second communication system to indicate that it is in a responsive state when the first protocol is predicted to be inactive.

The method may comprise transmitting traffic data to the communication device by means of the second protocol when the second communication system is indicated to be in the responsive state.

The method may comprise transmitting the said buffered traffic data by means of the second protocol when the second communication system is indicated to be in the responsive state.

The present invention will now be described by way of example with reference to the accompanying drawings.

In the drawings:

FIG. 3 illustrates signal timing.

IEEE 802.11, like many other protocols, incorporates power saving (PS) mechanisms for enabling power consumption to be reduced by turning off or disabling the radio apparatus when there is no data to be transferred. Although it is not their intended usage within the IEEE 802.11 standard, in the present system these mechanisms are subverted to constrain when an IEEE 802.11 device transmits data packets so as to improve coexistence with Bluetooth.

Figure 1:
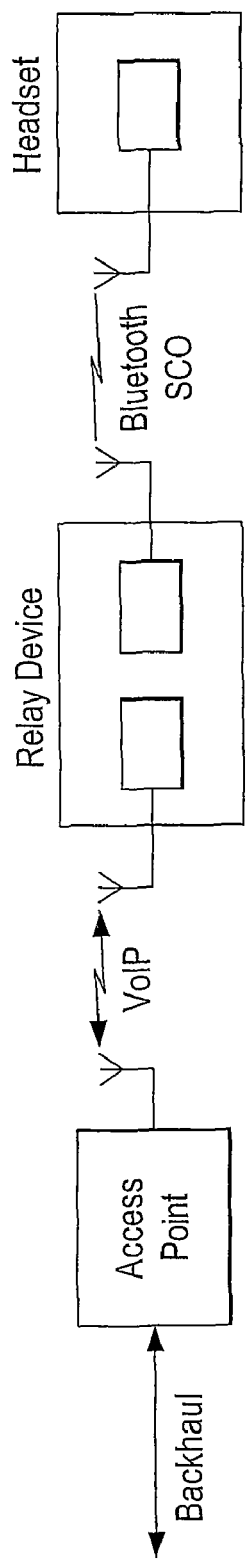
FIG. 1 shows the relaying of voice data through a relay device to a headset.
Figure 2:
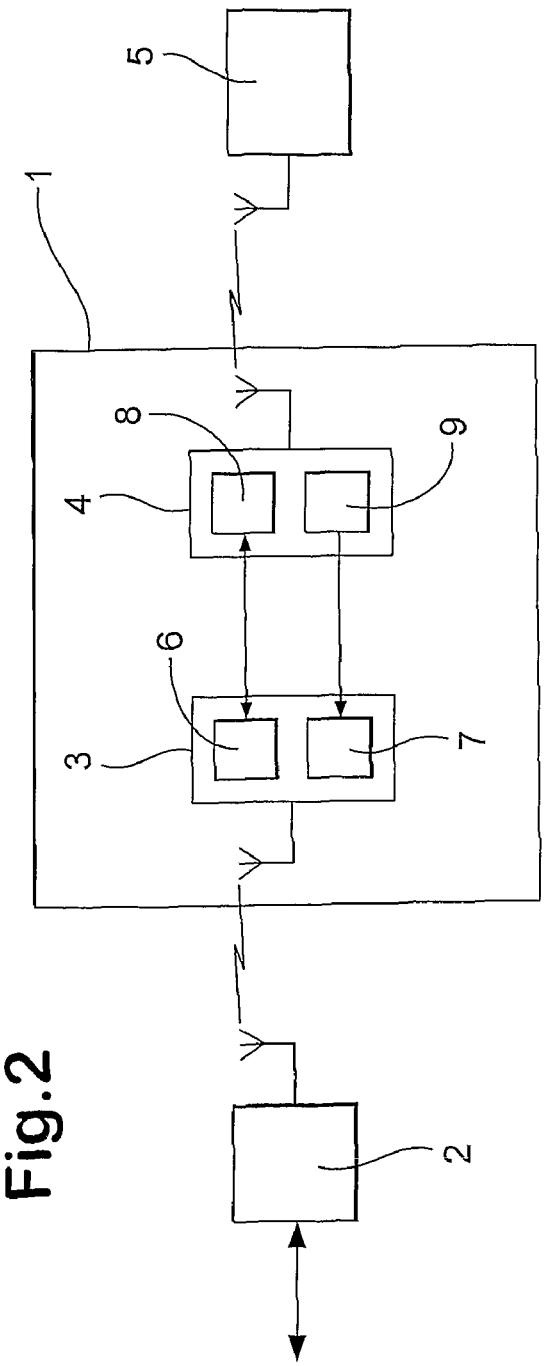
FIG. 2 shows a radio transceiver in which the present invention can be employed.

FIG. 2 shows schematically a system in which the present invention can be employed.

The system comprises transceivers 2 and 3 for signals according to a first radio protocol, and transceivers 4 and 5 for signals according to a second radio protocol. The transceivers 3 and 4 are co-located in a device 1. The first radio protocol is one in which the timings of transmission of signals by the transceiver 2 can be influenced during operation by means of the transceiver 3. Preferably the transceiver 3 can signal the transceiver 2 that it is in or about to enter a mode in which it is inoperative for receiving data, and the first protocol is such that the transceiver 2 can be expected to respond to such signalling by not transmitting data to the transceiver 3 whilst the transceiver 3 remains in that mode. The second radio protocol is one in which transmission of signals occurs in bursts (e.g. packets or frames). One example of such a situation is where the first radio protocol is IEEE 802.11 and the second protocol is Bluetooth.

The transceiver 4 has knowledge of when activity (most significantly transmission activity by transceiver 4) is expected over the link between it and the transceiver 5. This may, for example, be because that activity occurs in periodic time slots, or because it is scheduled according to some algorithm. The transceiver 4 informs the transceiver 3 of the times when such activity is expected. The transceiver 3 then signals the transceiver 2 so that it is in a mode in which it is inoperative for receiving data at those times. As a result, the transceiver 2 is inhibited from sending data at those times. Consequently the risk of data being lost due to it having to be received by the transceiver 3 when there is activity over the link between transceivers 4 and 5 is reduced.

Taking the example of a device 1 incorporating capabilities for both IEEE 802.11 (by means of transceiver 3) and Bluetooth (by means of transceiver 4), it may happen that a voice call is being forwarded from transceiver 2 to transceiver 5 using IEEE 802.11 VoIP and Bluetooth SCO or eSCO. The timing of the Bluetooth SCO slots used by the device is known to the Bluetooth transceiver 4, and can be signalled to the collocated IEEE 802.11 transceiver 3. Any suitable mechanism can be used for the signalling, but one preferred example is by way of a PTA (packet traffic arbitrator). The PTA is an independent entity that can receive status information and transmit requests from both the Bluetooth and IEEE 802.11 radios and grants permission to one or both of those radios to transmit. The decision to grant permission is based on an assessment by the PTA of the risk of a collision occurring. The collocated IEEE 802.11 transceiver 3 can then signal the other IEEE 802.11 transceiver 2 with which it is communicating using the PS signalling mechanism to indicate that it is in power saving mode during the expected Bluetooth SCO slots, and active for the remainder of the time. The PM (power management) bit in the frame control field of the header of a packet sent from transceiver 3 to transceiver 2 can be used to signal to the other that the IEEE 802.11 radio transceiver 3 is asleep during the SCO slots but awake during the gaps between them. In this way the device 1 can constrain the remote IEEE 802.11 transceiver 2 to transmit data to the IEEE 802.11 transceiver 3 during the gaps between SCO packets.

When the remote transceiver 2 is constrained not to send data to the transceiver 3 it can buffer packets (e.g. VoIP packets) intended for the transceiver 3. This may be part of the normal support that the transceiver 2 provides for the PS mode. When the transceiver 3 subsequently indicates that it is awake the packets intended for device 1 are transmitted to the transceiver 3. If the packets relate to a delay-critical protocol such as VoIP the transceiver 2 could decide not to send packets that have been delayed by more than a predetermined amount, in order to prevent excessive delays from building up.

Performance of this technique can be improved by using Bluetooth AFH (adaptive frequency hopping). Provided the transceivers 3 and 4 were designed to avoid excessive mutual interference (e.g. by suitable separation and/or shielding), the use of AFH enables both transceivers to successfully receive simultaneously and to successfully transmit simultaneously. This can be achieved by the Bluetooth transceiver using AFH to operate at frequencies that are not in use simultaneously by the IEEE 802.11 transceiver. The uplink data packet from the mobile device to the IEEE 802.11 transceiver 2 can then overlap a Bluetooth transmit slot, leaving more time for the downlink packet.

It should be noted that when implemented using IEEE 802.11 and Bluetooth, as described above, this technique does not require any proprietary protocol changes or support for advanced protocol features in any of the transceivers 2 to 5. In comparison to the prior art it can be implemented entirely within the device 1. Hence, it can work with existing installed equipment for the transceivers 2 and 5.

Another advantage of the method described above is that power saving over the link between transceivers 2 and 3 can be implemented when in normal circumstances power saving would not be used over that link. Additionally, imposing time-division behaviour on the device 1 in the manner described above can permit relatively efficient sharing of a single antenna between the IEEE 802.11 and Bluetooth radios.

In the specific case of IEEE 802.11, there are other power save signalling schemes that may be used to synchronise the behaviour of the transceiver 2 with expected activity over the link between transceivers 4 and 5 as an alternative to changing the PM bit in the frame headers. The following are options:
i) PS-Poll frames may be used to solicit a single packet from the transceiver 2. This may result in better performance when used with transceivers that support immediate PS-Poll response, but involves more IEEE 802.11 packets being transmitted for each data packet transferred if the transceiver 2 uses deferred PS-Poll responses. It also has the disadvantage that behaviour is poorly defined if no packet is buffered.
ii) If the transceiver 2 and the transceiver 3 both support IEEE 802.11e's U-APSD (Unscheduled Automatic Power-Save Delivery) then the uplink Data frame may be used to trigger the transceiver 2 to transmit a buffered downlink Data frame. This is more efficient than either changing the PM bit or using PS-Poll packets, but it relies on optional functionality being implemented by the transceiver 2.

The same mechanisms could also be used to support coexistence with any other collocated (non-Bluetooth) radios that are degraded by or cause interference to IEEE 802.11.

The mechanism by which the signalling between the transceivers 3 and 4 can be performed will be described with reference to FIG. 2. Each of the transceivers 3 and 4 comprises a protocol processing unit 6, 8 which encodes and decodes traffic data according to the protocol used by the transceiver, and a control unit 7, 9 which controls the operation of the transceiver. The control unit 9 of the transceiver 4 has knowledge of or can predict when there will be activity over the link between it and the transceiver 5. It transmits this information to the control unit 7 of the transceiver 3, which signals the protocol processing unit 6 of the transceiver 3 to cause it to transmit signals for indicating that the transceiver 3 is entering or leaving the power save mode.

FIG. 3 illustrates signalling timings for the example where the device 5 is a Bluetooth audio device and the transceiver 2 is an IEEE 802.11 access point. The upper row shows activity over the link between transceivers 4 and 5. HV3 frames are transmitted, but there is a periodic window of 2.5 ms when there is no Bluetooth activity. The second and third rows illustrate transmissions on the link between transceivers 2 and 3. At the start of the 2.5 ms window the transceiver 3 transmits a signal to the transceiver 2 to indicate that it is leaving its power saving state (PM bit=0). This is acknowledged by the transceiver 2, which then transmits traffic data (e.g. VoIP data) to the transceiver 3. The traffic data is acknowledged by the transceiver 3. Then, before the end of the window the transceiver 3 signals the transceiver 2 that it is entering its power saving state (PM bit=1). This is acknowledged by the transceiver 2, which then stops transmitting data to the transceiver 3. The transceiver 2 could continue to transmit data to other receivers whilst transceiver 3 is in its power saving state. However, since data destined for the transceiver 3 does not have to be decoded during that time it will not be corrupted on reception by signals over the link between transceivers 4 and 5.

The method can be used with protocols other than IEEE 802.11 and Bluetooth. This invention is beneficial when used with any two communications technologies that suffer from mutual interference when operated simultaneously, and where the activity of a transmitter of one system can be remotely controlled to stop and start it transmitting. It could also be used with a single communications technology that may maintain multiple active communications links but can only operate on one at a time, e.g. a Bluetooth device that is operating in a scatternet.

The mechanism by which activity over one of the protocols (the protocol between transceivers 4 and 5 in FIG. 2) is anticipated depends on the nature of the communications over that protocol. Some potential mechanisms are as follows:
1. If the communications over that protocol may be strictly or approximately periodic then that periodicity can be used to predict when idle periods will occur. The period may be detected by receiving successive signalling episodes or may be pre-programmed into the unit of the system that is to predict activity.
2. If the communications over that protocol occur according to a predetermined schedule that is complex or non-periodic then that schedule can be used to predict when idle periods will occur. The schedule could be set by the nature of the protocol that is in use, or could be selected by the transceivers 4 and/or 5 so as to allow for idle periods that can be used for communications over the link between transceivers 2 and 3. The schedule could be pre-programmed into the unit of the system that is to predict activity. Communications may be detected so as to synchronise with a pre-stored schedule. This method may also be used with periodic transmissions. The schedule may be embodied as data defining the timings of a series of transmissions relative to each other.
3. As an alternative to predicting activity according to a periodic or irregular schedule, communications over that protocol could be anticipated simply based on the existence of current activity over the link. Activity over the link between the other transceivers (2 and 3) could be stopped or inhibited in response to the detection of current activity over the link between transceivers 4 and 5.

In the above mechanisms 1 and 2 the timing of one or more instances of activity over the link between transceivers 4 and 5 is detected and applied as input to a predictive algorithm. That algorithm may attempt to detect periodicity in the activity or may try to fit one or more pre-stored activity patterns to the detected activity. Once a pattern has been determined for use and has been synchronised with the detected activity the algorithm provides output indicative of the times at which future activity is predicted. In contrast, algorithm 3 does not algorithmically predict future activity but simply responds to current activity.

Activity over the link between transceivers 2 and 3 may be controlled in response to any activity over the link between transceivers 4 and 5 or only in response to transmission activity by the transceiver 4 that is collocated with the transceiver 3.

The mechanism by which activity over the link between transceivers 2 and 3 is controlled depends on the protocol used for that link. It is preferably a mechanism whereby a transmitter (transceiver 2) can be controlled by a communication partner (transceiver 3) to start or stop transmission of data, at least traffic data, to it. The mechanism is preferably implemented by means of messages sent over the link that indicate that such transmission is to be started or stopped. The transmitter (transceiver 2) is preferably configured to be responsive to those messages to start and stop transmission of data, at least traffic data, to the communication partner in accordance with those messages. In this situation, since there can be expected to be a delay between the transmission of the "stop" message and the ceasing of transmission by the transmitter (especially if the transmitter will acknowledge the "stop" message) the communication partner (transceiver 3) is preferably configured to send the "stop" message at least a predetermined time before activity is expected over the other link.

When the mechanism is a power saving mode, the transceiver 3 could be left fully operational even when it has indicated that it is in the power saving mode.

The device 1 could be configured to automatically relay over each of the links data sent to it over the other of the links.

The transceivers 3 and 4 which are located in device 1 could have separate antennas or could share the same antenna. They could also share other components such as receive and/or transmit power amplifiers and filters. They are preferably located in the same housing, i.e. the housing of device 1. The device 1 could be a hand-portable device such as a laptop computer, a mobile phone or a PDA. Alternatively it could be fixed in location. In one application, the relay device can operate for relaying voice communications between a wireless LAN access point (which would comprise transceiver 2) and a user interface device such as a headset (which would comprise transceiver 5). The backhaul of signals from the wireless LAN access point to a remote terminal could be performed over a wired link (e.g. an Ethernet link) from the access point.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A communication device comprising:
   a first communication system for transmitting and/or receiving signals according to a first protocol;
   a second communication system for transmitting and receiving signals according to a second protocol, the second protocol having the facility that a receiver can indicate to a transmitter that it is in an unresponsive state whereby the transmitter can be inhibited from transmitting data to the receiver when it is in the unresponsive state;
   a signal activity detector for detecting activity in the signals of the first protocol;
   a signal activity predictor responsive to the signal activity detector for predicting activity in the signals of the first protocol, in accordance with a predictive algorithm to which inputs are applied from said signal activity detector; and
   a control unit responsive to the signal activity detector via the signal activity predictor for causing the second communication system to transmit one or more signals to indicate that it is in an unresponsive state when the first protocol is predicted to be active.

2. A communication device as claimed in claim 1, wherein the control unit is responsive to the signal activity detector for causing the second communication system to transmit one or more signals to indicate that it is in an unresponsive state when the first protocol is detected to be active.

3. A communication device as claimed in claim 2, wherein the control unit is responsive to the signal activity detector for causing the second communication system to transmit one or more signals to indicate that it is in a responsive state when the first protocol is detected to be inactive.

4. A communication device as claimed in claim 1, wherein the signal activity detector for detecting activity in the signals of the first protocol detects both transmit signals and receive signals.

5. A communication device as claimed in claim 3, wherein the signal activity predictor is arranged to predict activity in the signals of the first protocol by detecting periodicity in the signals of the first protocol.

6. A communication device as claimed in claim 3, wherein the signal activity predictor is arranged to predict activity in the signals of the first protocol by detecting synchronisation of the signals of the first protocol with a pre-stored activity schedule.

7. A radio transmitter as claimed in claim 4, wherein the control unit is responsive to the signal activity predictor for causing the second communication system to transmit one or more signals to indicate that it is in a responsive state when the first protocol is predicted to be inactive.

8. A communication device as claimed in claim 1, wherein the first and second protocols are different.

9. A communication device as claimed in claim 1, wherein the first and second protocols occupy a common frequency band.

10. A communication device as claimed in claim 1, wherein the first protocol is Bluetooth.

11. A communication device as claimed in claim 1, wherein the second protocol is a wireless local area network protocol.

12. A communication device as claimed in claim 11, wherein the second protocol is an IEEE 802.11 protocol.

13. A communication device as claimed in claim 1, wherein the said state is a power-saving state.

14. A communication device as claimed in claim 1, wherein one of the first and second protocols is the Bluetooth SCO or eSCO protocol.

15. A communication device as claimed in claim 1 wherein the first communication system and the second communication system are located within a common housing.

16. A communication device as claimed in claim 1, wherein the second communication system is arranged to relay traffic data received by the first communication system according to the first protocol by transmitting it according to the second protocol.

17. A communication device as claimed in claim 1, wherein the first communication system and the second communication system have antennas and the antennas are located such that signals of the first protocol transmitted by the antenna of the first communication system are capable of interfering with signals of the second protocol so as to prevent signals of the second protocol from being successfully received by the first communication system.

18. A communication device as claimed in claim 1, wherein the first communication system and the second communication system have a common antenna, and the systems are arranged such that signals of the first protocol transmitted using the antenna by the first communication system are capable of interfering with signals of the second protocol so as to prevent signals of the second protocol from being successfully received through the antenna by the first communication system.

19. A communication device as claimed in claim 1, wherein the said signals of the first protocol are signals transmitted according to the first protocol by a further device remote from the said radio transmitter.

20. A method for operating a communication device comprising a first communication system for receiving and/or transmitting signals according to a first protocol and a second communication system for transmitting and receiving signals according to a second protocol, the second protocol having the facility that a receiver can indicate to a transmitter that it is in an unresponsive state whereby the transmitter can be inhibited from transmitting data to the receiver when it is in the unresponsive state; the method comprising:

detecting activity in the signals of the first protocol;

in response to detecting activity in the signals of the first protocol, predicting periods of activity in the signals of the first protocol in accordance with a predictive algorithm to which inputs are applied from results of said detecting activity; and causing the second communication system to transmit one or more signals to indicate that it is in an unresponsive state when the first protocol is predicted to be active.

21. A method as claimed in claim 20, comprising ceasing transmitting traffic data to the communication device by means of the second protocol when the second communication system is indicated to be in the unresponsive state.

22. A method as claimed in claim 21, comprising buffering traffic data intended for the communication device when the second communication system is indicated to be in the unresponsive state.

23. A method as claimed in claim 20, comprising the step of:

causing the second communication system to indicate that it is in a responsive state when the first protocol is predicted to be inactive.

24. A method as claimed in claim 23, comprising transmitting traffic data to the communication device by means of the second protocol when the second communication system is indicated to be in the responsive state.

25. A method as claimed in claim 24, comprising transmitting the said buffered traffic data by means of the second protocol when the second communication system is indicated to be in the responsive state.

26. A communication device as claimed in claim 1, wherein said predictive algorithm detects periodicity in signal activity of the first protocol.

27. A communication device as claimed in claim 1, wherein said predictive algorithm attempts to fit pre-stored activity patterns to said detected activity.

28. A method as claimed in claim 20, wherein said predictive algorithm detects periodicity in signal activity of the first protocol.

29. A method as claimed in claim 20, wherein said predictive algorithm attempts to fit pre-stored activity patterns to said detected activity.

\* \* \* \* \*

UNITED STATES PATENT AND TRADEMARK OFFICE
CERTIFICATE OF CORRECTION

PATENT NO. : 8,203,991 B2
APPLICATION NO. : 12/065477
DATED : June 19, 2012
INVENTOR(S) : Alexander Thoukydides It is certified that error appears in the above-identified patent and that said Letters Patent is hereby corrected as shown below:

On the column 2, line 44, "he" is corrected to --the--

On the column 5, lines 7-8, "power save signaling" is corrected to --power saving state signaling--

Signed and Sealed this
Twenty-sixth Day of February, 2013

Teresa Stanek Rea
*Acting Director of the United States Patent and Trademark Office*